(12) United States Patent
Deng et al.

(10) Patent No.: US 8,184,197 B2
(45) Date of Patent: May 22, 2012

(54) FOCUS DETECTING APPARATUS AND IMAGE PICK-UP APPARATUS HAVING THE SAME

(75) Inventors: Shitao Deng, Suwon-si (KR); Kyong-Tae Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 406 days.

(21) Appl. No.: 12/578,409

(22) Filed: Oct. 13, 2009

(65) Prior Publication Data

US 2010/0165175 A1 Jul. 1, 2010

(30) Foreign Application Priority Data

Dec. 29, 2008 (KR) ........................ 10-2008-0135951

(51) Int. Cl.
| | |
|---|---|
| H04N 5/232 | (2006.01) |
| G03B 3/10 | (2006.01) |
| G03B 7/28 | (2006.01) |
| G03B 13/18 | (2006.01) |
| G03B 17/00 | (2006.01) |
| G06K 9/40 | (2006.01) |
| G06K 9/00 | (2006.01) |

(52) U.S. Cl. ........ 348/345; 348/349; 348/350; 396/121; 396/79; 396/119; 396/111; 396/89; 382/255; 382/254; 382/167

(58) Field of Classification Search .......... 348/345–352, 348/187–188; 396/79–83, 89–154; 382/254, 382/255, 312, 167; 355/18, 53, 112, 44

See application file for complete search history.

(56) References Cited

U.S. PATENT DOCUMENTS

| | | | | |
|---|---|---|---|---|
| 6,363,220 | B1 * | 3/2002 | Ide | 396/98 |
| 7,412,159 | B2 * | 8/2008 | Ichimiya | 396/104 |
| 7,936,986 | B2 * | 5/2011 | Ichimiya | 396/98 |
| 2007/0258710 | A1 * | 11/2007 | Yamasaki | 396/121 |
| 2009/0202234 | A1 | 8/2009 | Ichimiya | |

FOREIGN PATENT DOCUMENTS

| | | |
|---|---|---|
| JP | 2005-055768 | 3/2005 |
| JP | 2005055768 A * | 3/2005 |
| WO | WO 2008/093894 | 8/2008 |

OTHER PUBLICATIONS

European Search Report issued in European Application No. 09172953.3, mailed Dec. 7, 2009.
English language abstract of JP 2005-055768, published Mar. 3, 2005.
Machine English language translation of JP 2005-055768, published Mar. 3, 2005.

* cited by examiner

*Primary Examiner* — Lin Ye
*Assistant Examiner* — Marly Camargo
(74) *Attorney, Agent, or Firm* — The Farrell Law Firm, P.C.

(57) ABSTRACT

Disclosed are a focus detecting apparatus capable detection in various light illumination conditions and an image acquiring apparatus having the same. The focus detecting apparatus may include a mark disposed on a primary image plane. A pair of images of the mark is detected by a sensor, the distance between which images is used to determine the main wavelength of the light received from a subject. The main wavelength is used in determining the chromatic aberration correction by which the defocus amount may be adjusted.

18 Claims, 7 Drawing Sheets

FOCUS DETECTING APPARATUS AND IMAGE PICK-UP APPARATUS HAVING THE SAME

CROSS-REFERENCE TO RELATED APPLICATIONS

This application claims the benefit under 35 U.S.C. §119(a) of Korean Patent Application No. 10-2008-0135951, filed on Dec. 29, 2008, in the Korean Intellectual Property Office, the entire disclosure of which is hereby incorporated by reference in its entirety.

TECHNICAL FIELD

The present invention relates generally to a focus detecting apparatus, and more particularly, to a focus detecting apparatus capable of correcting errors depending on the type of light illumination on a subject.

BACKGROUND OF RELATED ART

Recently, image pick-up apparatuses such as cameras are being equipped with an automatic focusing function which enables a lens to automatically focus on a subject for the convenience of users. Focus detecting apparatuses detect the focus state and defocus amount of photographing lenses so that lenses can be made to automatically adjust the focus on a subject.

When the chromatic aberration phenomenon occurs, that is, when a refractive index differs depending on the wavelength, errors may occur when detecting the focus state of a photographing lens. Generally, it is desirable to focus on a subject based on a wavelength (about 587 nm) of the green color to which the human eye is most sensitive. However, the wavelengths of the light source(s) illuminating a subject may change according to the surroundings. Focus detecting apparatuses detect the focus state of photographing lenses based on the light incident on focus detecting apparatuses. If the main wavelengths of the light source illuminating the subject significantly deviate from the wavelengths of green, it may be difficult, or even impossible in some cases, for the lens to focus precisely on the subject.

Moreover, in a dark environment, it may be difficult for the focus detecting apparatus to accurately detect the focus state of the photographing lens due to the reduced amount of light available for the focus detecting apparatus. Typically, in such a dark environment, an auxiliary light source, for example, a flash light, is used to provide an additional illumination of the subject. The light provided by such an auxiliary light source typically includes infrared rays. The wavelengths of infrared rays are significantly far apart from the wavelengths of green in the spectrum, also resulting in possible errors when detecting the focus state of the photographing lens.

Studies on focus detecting apparatuses for correcting errors relating to various types of light illumination sources are on-going, but unfortunately thus far without a satisfactory solution for correcting these errors. Additionally, determining the type of light sources may require a number of additional components, likely resulting in the increased manufacturing cost and/or overall size of, and/or in a reduction in the producibility of, an image acquiring apparatus.

SUMMARY OF THE DISCLOSURE

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a focus detecting apparatus which is capable of accurately correcting errors occurring depending on the type of light sources irradiating a subject, even with a simple configuration.

According to an aspect of the present disclosure, there may be provided a focus detecting apparatus for use in an image pick-up apparatus. The focus detecting apparatus may comprise a mark arranged on a primary image plane, a sensor unit, a primary defocus computing unit, a wavelength detecting unit, a correction computing unit and a secondary defocus computing unit. A pair of images of the subject and a pair of images of the mark may be formed on the sensor unit. The primary defocus computing unit may be configured to compute a primary defocus amount according to a distance between the pair of images of the subject. The wavelength detecting unit may be configured to determine a main wavelength of light entering the image pick-up apparatus according to a distance between the pair of images of the mark. The correction computing unit may be configured to compute a chromatic aberration correction amount according to the main wavelength determined by the wavelength detecting unit. The secondary defocus computing unit may be configured to add the chromatic aberration correction amount to the primary defocus amount to obtain a final defocus amount.

The mark may comprise a straight line.

The mark may comprises a plurality of marks each arranged on the primary image plane.

A plurality of pair of mark images may be formed on the image sensor unit, each of which plurality of pair of mark images may correspond to a respective associated one of the plurality of marks. The wavelength detecting unit may be configured to determine the main wavelength of the light entering the image pick-up apparatus to be an average of wavelengths corresponding to respective distances between each pair of mark images.

The focus detecting apparatus may further comprise a wavelength data memory configured to store therein wavelength data corresponding to the distance between the pair of images of the mark.

The wavelength data may comprise a data table.

The wavelength data may comprise an approximating polynomial coefficient.

The correction computing unit may be configured to receive chromatic aberration characteristic data of a lens unit of the image pick-up apparatus.

The sensor unit may comprise a plurality of photoelectric sensors.

The plurality of photoelectric sensors may comprise a first detector and a second detector. The first detector may be configured to detect the pair of images of subject, and may be a first subset of the plurality of photoelectric sensors. The second detector may be configured to detect the pair of images of the mark, and may be a second subset of the plurality of photoelectric sensors.

The sensor unit may alternatively comprise a first photoelectric sensor and a second photoelectric sensor. The first photoelectric sensor may be configured to detect the pair of images of the subject. The second photoelectric sensor may be configured to detect the pair of images of the mark.

According to another aspect of the present disclosure, an image pick-up apparatus may be provided to comprise a lens unit, a focus detecting apparatus and an image pickup area. The lens unit may be configured to focus light received from a subject. The image pickup area may be exposed to the light received from the subject. The focus detecting apparatus may be configured to detect a focus state of the lens unit, and may comprise a mark arranged on a primary image plane, a sensor unit, a primary defocus computing unit, a wavelength detecting unit, a correction computing unit and a secondary defocus computing unit. A pair of images of the subject and a pair of images of the mark may be formed on the sensor unit. The primary defocus computing unit may be configured to compute a primary defocus amount according to a distance between the pair of images of the subject. The wavelength detecting unit may be configured to determine a main wavelength of light entering the image pick-up apparatus according to a distance between the pair of images of the mark. The correction computing unit may be configured to compute a chromatic aberration correction amount according to the main wavelength determined by the wavelength detecting unit. The secondary defocus computing unit may be configured to add the chromatic aberration correction amount to the primary defocus amount to obtain a final defocus amount.

According to yet another aspect of the present disclosure, an apparatus may be provided for detecting a state of focus of an image acquiring apparatus that acquires an image of a subject by receiving light from the subject. The apparatus may comprise a mark arranged on a primary image plane, one or more image sensors and a focus operation controller. The one or more image sensors may be arranged in an optical path of the light such that the one or more image sensors receive a pair of images of the mark, and may be configured to output an electrical signal representative of the pair of images of the mark. The focus operation controller may have an input through which to receive the electrical signal output by the one or more image sensors. The focus operation controller may be configured to determine a main wavelength associated with the light based on a distance between the pair of images of the mark, and may further be configured to determine the state of focus based at least in part on the determined main wavelength.

The one or more image sensors may receive a pair of images of the subject in addition to the pair of images of the mark. The focus operation controller may comprise a primary defocus computing unit, a wavelength detecting unit, a correction computing unit and a secondary defocus computing unit. The primary defocus computing unit may be configured to determine a primary defocus amount according to a distance between the pair of images of the subject. The wavelength detecting unit may be configured to determine the main wavelength of the light according to the distance between the pair of images of the mark. The correction computing unit may be configured to determine a chromatic aberration correction amount according to the main wavelength determined by the wavelength detecting unit. The secondary defocus computing unit may be configured to add the chromatic aberration correction amount to the primary defocus amount to obtain a final defocus amount.

According to an alternative embodiment, the one or more image sensors may receive a pair of images of the subject in addition to the pair of images of the mark. The focus operation controller may further be configured to determine a primary defocus amount according to a distance between the pair of images of the subject, to determine a chromatic aberration correction amount according to the determined main wavelength, and to add the chromatic aberration correction amount to the primary defocus amount to obtain a final defocus amount.

The one or more image sensors may comprise a first one or more photoelectric sensors arranged to receive the pair of images of the subject and a second one or more photoelectric sensors arranged to receive the pair of images of the mark.

The focus operation controller may be configured to perform a look-up operation from a look-up table that includes a distance-to-wavelength correlation information so as to determine the main wavelength associated with the light.

The focus operation controller may be configured to determine the chromatic aberration correction amount by performing a look-up operation from a look-up table that includes an information regarding correlations between wavelengths and chromatic aberration correction amounts.

BRIEF DESCRIPTION OF THE DRAWINGS

Various aspects and advantages of the present disclosure will become apparent and more readily appreciated from the following description of several embodiments thereof, taken in conjunction with the accompanying drawings, in which.

DETAILED DESCRIPTION OF SEVERAL EMBODIMENTS

Reference will now be made in detail to several embodiments, examples of which are illustrated in the accompanying drawings, wherein like reference numerals refer to like elements throughout. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should be also noted that in the drawings, the dimensions of the features are not intended to be to true scale and may be exaggerated for the sake of allowing greater understanding.

Figure 1:
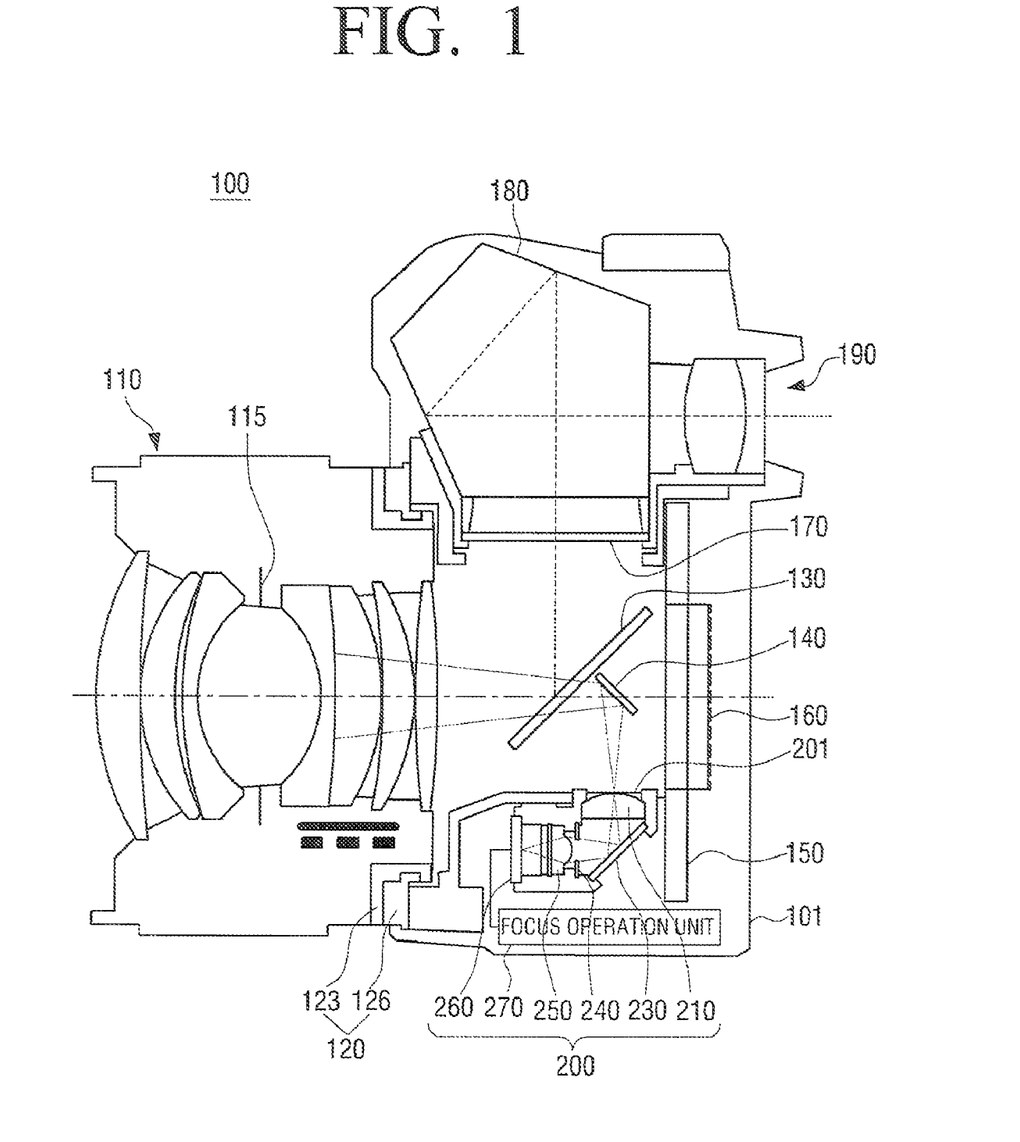
FIG. 1 schematically illustrates an image pick-up apparatus according to an embodiment of the present disclosure.

FIG. 1 schematically illustrates an image pick-up apparatus 100 according to an embodiment of the present disclosure.

The image pick-up apparatus 100 according to an embodiment may be implemented as, for example, a digital single-lens reflex (DSLR) camera. While in the following descriptions, for the purposes of convenience, a DSLR is described by way of illustrative example, it should however be noted that the scope of the present disclosure is not so limited, and is equally applicable to any image pick-up apparatuses, and not just to a DSLR camera.

As shown in FIG. 1, an image pick-up apparatus 100 according to an embodiment may include a lens unit 110, a mount 120, a main mirror 130, a sub-mirror 140, a focal plane shutter 150, an image pickup area 160, a focusing screen 170, a pentaprism 180, an eyepiece 190 and a focus detecting apparatus 200.

The lens unit 110 may be configured to focus the light received from a subject on the image pickup area 160. According to an embodiment, the lens unit 110 may include a plurality of lenses as shown in FIG. 1. In the case of some DSLR cameras, the lens unit 110 may be interchangeable.

The lens unit 110 may also include an image stabilizer (IS) (not shown) and/or an autofocus (AF) driver (not shown). The IS prevents the blurring of the image due to the user's hands shaking when the photograph is taken. The AF driver may be configured to receive information regarding the focus state of the lens unit 110 from the focus detecting apparatus 200, and to move the focusing lenses using the received information.

The lens unit 110 may includes the iris 115. The iris 115 may regulate the amount of light passing through the lens unit 110, and may also affect the depth of field of an image. For example, if the iris 115 is widened, a significant amount of light may pass through the lens unit 110, in which case, a user can take a photograph having greater brightness. However, the widened iris 115 may also cause the lens aperture to increase, reducing the depth of field of the photograph. On the other hand, if the iris 115 is narrowed, a smaller amount of light may pass through the lens unit 110, in which case, a photograph having lower brightness can be obtained. The narrower iris 115 may however cause the lens aperture to decrease, resulting in an increase in the depth of field of the photograph.

The mount 120 may allow the coupling therethrough of the lens unit 110 to a body 101 of the image pick-up apparatus 100. Additionally, the mount 120 may assist in the alignment of the center of the image pickup area 160 with an optical axis of the lens unit 110.

The mount 120 may include a lens mount 123 provided on the side of the lens unit 110 and a body mount 126 provided on the body 101. The lens mount 123 may be engaged with the body mount 126 so that the lens unit 110 may be securely mounted to the body 101 of the image pick-up apparatus 100.

The main mirror 130 may partially transmit therethrough light received from the lens unit 110, and may reflect the remainder of the light. Specifically, the main mirror 130 reflects some of the light passing through the lens unit 110 to the focusing screen 170, so that a user can view the subject image formed on the focusing screen 170 through the eyepiece 190. The light transmitted through the main mirror 130 is directed toward the focus detecting apparatus 200 so that the focus detecting apparatus 200 may detect the focus state of the lens unit 110.

The sub-mirror 140 may guide the light transmitted through the main mirror 130 to the focus detecting apparatus 200.

The focal plane shutter 150 may be disposed immediately in front of the image pickup area 160. The focal plane shutter 150 may be implemented as a pair of black curtains, which are referred to as a front curtain and a rear curtain, or metallic screens. During a photographing operation, the front curtain of the focal plane shutter 150 opens so that the image pickup area 160 is exposed to the light, and the rear curtain thereof closes so as to shield the image pickup area 160 from the light. Accordingly, the focal plane shutter 150 may adjust the shutter speed using the time difference between the respective closures of the front and rear curtains.

The image pickup area 160 is an area that is exposed to light so that the image of the subject can be acquired. When the image of the subject is being acquired, the main mirror 130 and sub-mirror 140 are withdrawn from or retracted away from the optical path. While, in the case of a film camera, a film may be placed on the image pickup area 160, in the case of a digital camera, image sensors may be disposed on the image pickup area 160. Such image sensors may include, for example, charge-coupled devices (CCD) and complementary metal-oxide-semiconductors (CMOS). CCD sensors have a relatively high light sensitivity and high image quality, and are thus utilized in most digital cameras. However, A CCD has the disadvantages of having a complicated fabricating process and higher manufacturing costs. CMOS sensors, on the other hand, can be fabricated relatively easily at a lower cost than CCD sensors, and are in wide usage in inexpensive digital cameras. Recently, however, with the improvements in the CMOS image processing technologies enabling higher quality images, DSLR cameras using CMOS sensors are gaining popularity even among professional photographers.

The focusing screen 170 may include a mat plane and a fresnel lens. The mat plane may be disposed at a position optically equivalent to the image pickup area 160, and thus displays the same image as the photographed image. The fresnel lens collects light that has passed through the mat plane so that a user may view a brighter image through the eyepiece 190.

The pentaprism 180 is a five-sided reflecting prism. The pentaprism 180 changes the left and right inverse image formed on the focusing screen 170 to orient the image in the normal orientation. Accordingly, a user may be able to view the framed image through the viewfinder in the same form as the subject image appears to the naked eyes of the user.

The eyepiece 190 may allow the user to see the image formed on the focusing screen 170 by forming a virtual image of approximately 1 meter (m) in front of the lens. Thus, the user can view an image to be captured at the image pickup area 160 also through the eyepiece 190.

The focus detecting apparatus 200 detects the focus state of the lens unit 110. The focus detecting apparatus 200 may include a field lens 210, a mark 220 (see FIG. 2), a reflective mirror 230, a visual field mask 240, a separating lens 250, a sensor unit 260 and a focus operation unit 270.

Figure 2:
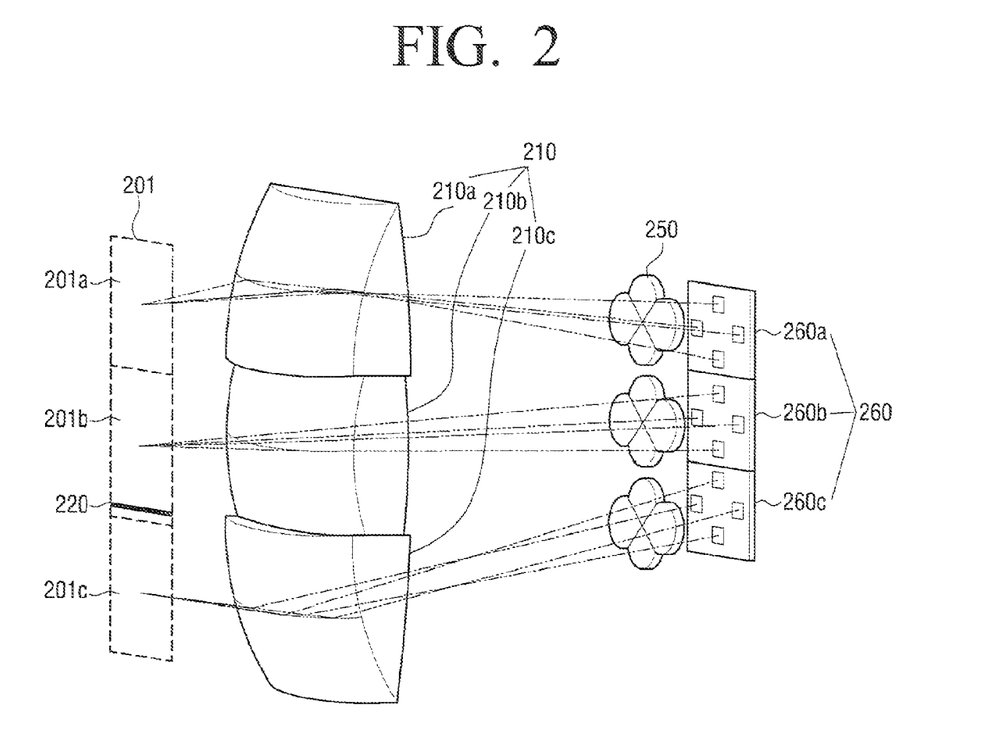
FIG. 2 illustrates the optical paths of a focus detecting apparatus shown in FIG. 1.
Figure 3:
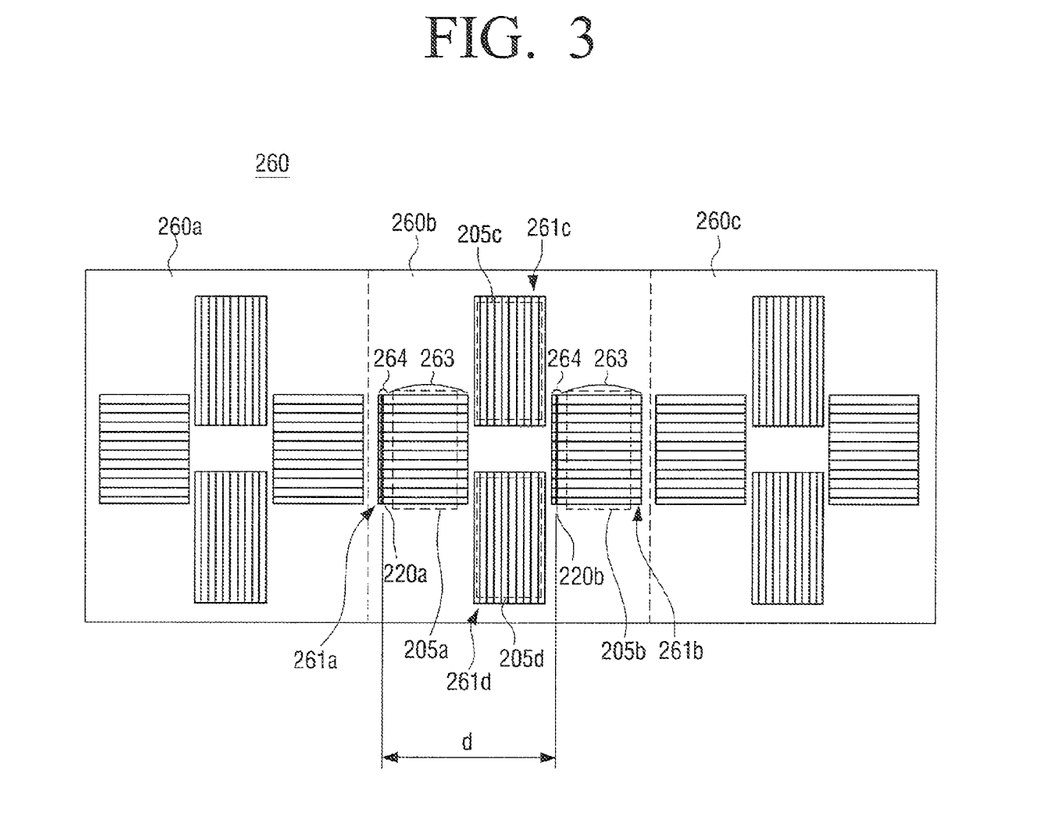
FIG. 3 is a plan view of a sensor unit shown in FIGS. 1 and 2.

FIG. 2 illustrates the relevant portions of the optical paths of the focus detecting apparatus 200 shown in FIG. 1. In FIG. 2, the reflective mirror 230 and visual field mask 240 are omitted for brevity and clarity. FIG. 3 shows a plane view of the sensor unit 260 shown in FIGS. 1 and 2.

A primary image plane 201 may be disposed in a position optically equivalent to the image pickup area 160. If the subject is in clear focus, an image of the subject may be formed on the primary image plane 201. Subsequently, the optical path continues through the field lens 210, the reflective mirror 230 and the separating lens 250 so that the subject may be imaged on the sensor unit 260.

The field lens 210 serves the functions of collecting light incident on the focus detecting apparatus 200, and is disposed adjacent to the primary image plane 201. According to an embodiment of the present disclosure, the field lens 210 may be divided into three parts 210a, 210b and 210c as shown in FIG. 2. With such a configuration, the light incident on the focus detecting apparatus 200 is divided into three beams, each of which is imaged on the sensor unit 260. In FIG. 2, the reference numeral 201a denotes a first area of the primary image plane 201 which faces the first part 210a of the field lens 210, the reference numeral 201b denotes a second area of the primary image plane 201 which faces the second part 210b of the field lens 210, and the reference numeral 201c denotes a third area of the primary image plane 201 which faces the third part 210c of the field lens 210.

The mark 220 is disposed on the primary image plane 201. In an embodiment of the present disclosure, the mark 220 is disposed on the second area 201*b* of the primary image plane 201 as shown in FIG. 2. However, this is merely an example. The mark 220 may additionally or instead be disposed on the first area 201*a* or the third area 201*c* of the primary image plane 201. According to an embodiment, the mark 220 appears as a straight line, but, in alternative embodiments, the mark 220 may be of various shapes other than the straight line.

The reflective mirror 230 reflects light incident on the focus detecting apparatus 200 towards the sensor unit 260. By the use of the reflective mirror 230, it may be possible to realize an efficiently use the space in the image pick-up apparatus 100, that is, unnecessary increase in the height of the image pick-up apparatus 100 may be avoided.

The visual field mask 240 may include a plurality of slits. Light passing through the plurality of slits passes through the separating lens 250 so that a plurality of subject images may be formed on the sensor unit 260.

The plurality of subject images and the image of the mark 220 are formed on the sensor unit 260. The sensor unit 260 may include a plurality of photoelectric sensors 261*a*, 261*b*, 261*c* and 261*d*. The sensor unit 260 may be divided into three sections 260*a*, 260*b* and 260*c*. The image on the first area 201*a* of the primary image plane 201 is secondarily imaged on the first section 260*a* of the sensor unit 260, the image on the second area 201*b* of the primary image plane 201 is secondarily imaged on the second section 260*b* of the sensor unit 260, and the image on the third area 201*c* of the primary image plane 201 is secondarily imaged on the third section 260*c* of the sensor unit 260. In this situation, two pairs of images are formed on each of the sections 260*a*, 260*b* and 260*c* horizontally and vertically, respectively, by the visual field mask 240 and the separating lens 250. More particularly, as shown in FIG. 3, a pair of subject images 205*a* and 205*b* may be formed horizontally while another pair of subject images 205*c* and 205*d* may be formed vertically on the second section 260*b* of the sensor unit 260. The pair of horizontally arranged photoelectric sensors 261*a* and 261*b* detect the pair of subject images 205*a* and 205*b*, respectively, while the pair of vertically arranged photoelectric sensors 261*c* and 261*d* detect the other pair of subject images 205*c* and 205*d*, respectively. In other words, the sensor unit 260 according to an embodiment may be considered to be a cross-type sensor unit 260. It should be noted however that other types of sensor unit may alternatively used. It is possible to obtain the focus state and defocus amount of the lens unit 110 using a phase difference detection method, for example, by measuring a distance between the pair of subject images 205*a* and 205*b* which are horizontally formed and a distance between the other pair of subject images 205*c* and 205*d* which are vertically formed.

An image of the mark 220 may also be formed on the sensor unit 260. For example, referring to FIG. 3, a pair of mark images 220*a* and 220*b* may be formed horizontally. The distance d between the pair of mark images 220*a* and 220*b* may vary according to the change in wavelength, which will be further described below in greater detail.

The pair of horizontally arranged photoelectric sensors 261*a* and 261*b* may include a first detector 263 for detecting the pair of subject images and a second detector 264 for detecting the pair of mark images 220*a* and 220*b*. Since the change in the distance d between the pair of mark images 220*a* and 220*b* may be small, the size of the second detector 264 of the photoelectric sensors 261*a* and 261*b* could be smaller than that of the first detector 263 of the photoelectric sensors 261*a* and 261*b*.

The other pair of mark images may also be formed vertically, but are not shown in FIG. 3. This is because the mark images would form vertical lines as shown in FIG. 3, so it may not be possible for the pair of vertically arranged photoelectric sensors 261*c* and 261*d* to detect the change in the distance between the mark images when they are formed vertically.

The photoelectric sensors 261*a*, 261*b*, 261*c* and 261*d* convert the detected subject images 205*a*, 205*b*, 205*c* and 205*d* and the mark images 220*a* and 220*b* into electrical signals.

The focus operation unit 270 may analyze the electric signals output from the sensor unit 260, and may compute the focus state and defocus amount of the lens unit 110 based on the analysis.

Figure 4:
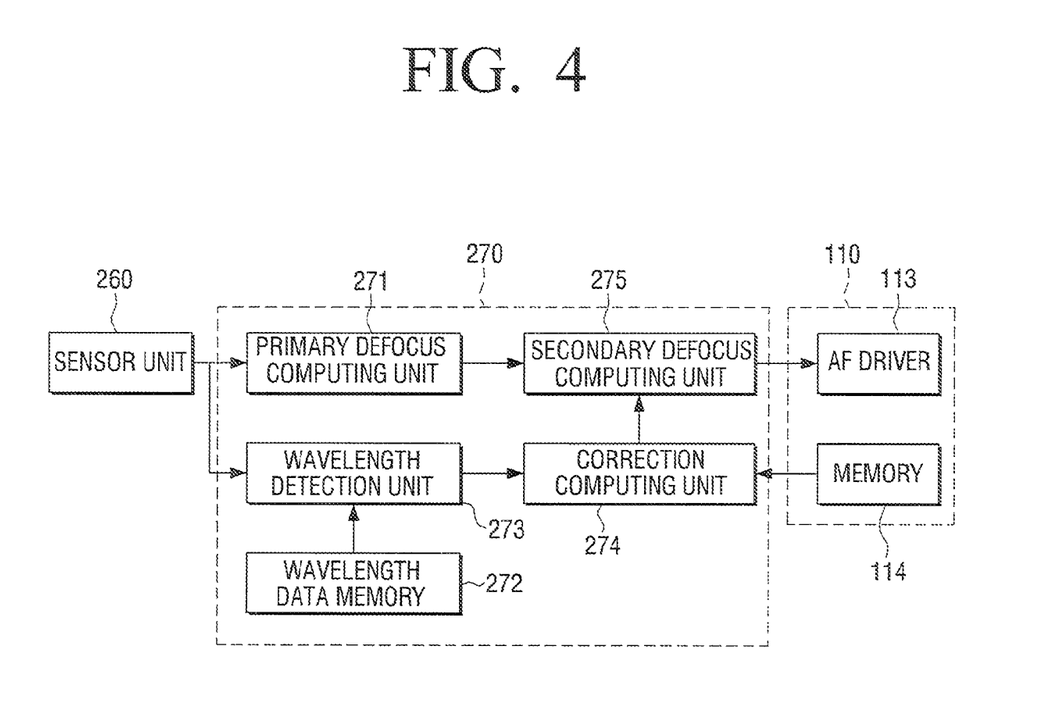
FIG. 4 is a block diagram of a focus operation unit shown in FIG. 1.

FIG. 4 is a block diagram of the focus operation unit 270 according to an embodiment. In FIG. 4, the focus operation unit 270 may include a primary defocus computing unit 271, a wavelength data memory 272, a wavelength detecting unit 273, a correction computing unit 274 and a secondary defocus computing unit 275.

The primary defocus computing unit 271 computes a primary defocus amount according to the distance between a pair of subject images. For example, the primary defocus computing unit 271 may analyze electrical signals output from the first detector 263 of the pair of horizontally arranged photoelectric sensors 261*a* and 261*b*, and may measure the distance between the pair of horizontally formed subject images 205*a* and 205*b* to compute the defocus amount using the phase difference detection method based on the measured distance. The phase difference detection method is well-known to those skilled in the art, and thus need not be described in detail.

In an embodiment of the present disclosure, in order to compute the defocus amount more accurately, the distance between the other pair of vertically formed subject images 205*c* and 205*d* may also be measured.

Figure 5:
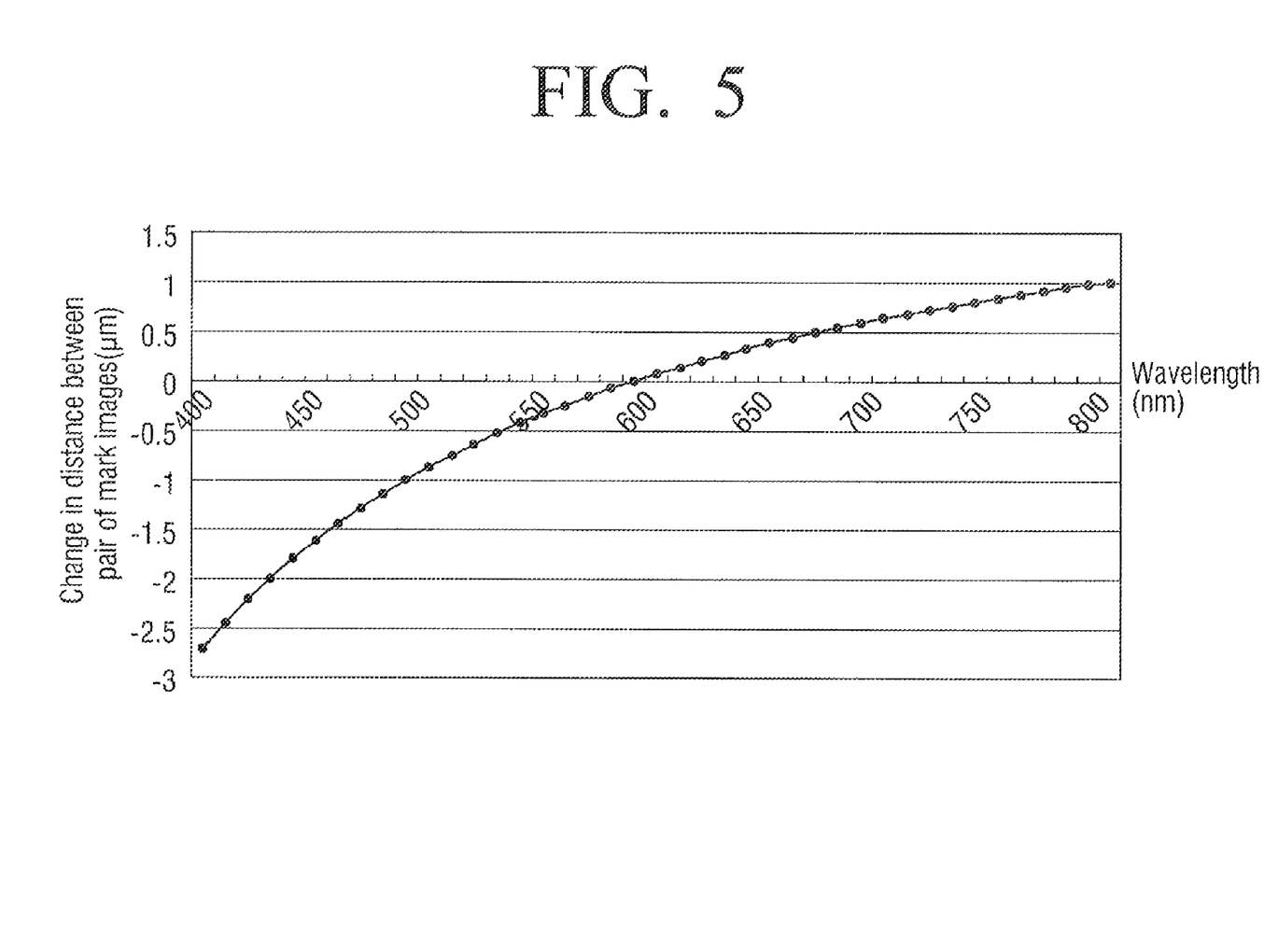
FIG. 5 is a graph showing a relationship between a wavelength and a change in distance between a pair of mark images.

FIG. 5 is a graph showing a relationship between a wavelength and the change in the distance between the pair of mark images 220*a* and 220*b*. In the graph of FIG. 5, the x-axis (or the horizontal axis) represents the wavelength while the y axis (or the vertical axis) represents the change in the distance between the pair of mark images 220*a* and 220*b*. Additionally, the distance between the pair of mark images 220*a* and 220*b* formed by light with a wavelength of 587 nm is used as a reference value. As shown in FIG. 5, when a wavelength exceeds 587 nm, the distance between pair of mark images 220*a* and 220*b* is increased. On the other hand, when the wavelength is below 587 nm, the distance between the pair of mark images 220*a* and 220*b* is reduced. Accordingly, it is possible to determine main wavelengths of light entering the image pick-up apparatus 100 based on the distance between the pair of mark images 220*a* and 220*b*. The relationship between the wavelength and the change in the distance between the pair of mark images 220*a* and 220*b*, for example, as shown in FIG. 5, may change according to the configuration of the optical system of the focus detecting apparatus 200. Data shown in FIG. 5 may be obtained empirically or using analytical methods after the focus detecting apparatus 200 is manufactured.

The wavelength data memory 272 stores wavelength data, e.g., the data shown in FIG. 5 corresponding to the distance between the pair of mark images. This wavelength data may be stored in the form of a data table (e.g., a look-up table) or an approximating polynomial coefficient, for example.

The wavelength detecting unit 273 detects the main wavelengths of light entering the image pick-up apparatus 100 according to the distance between the pair of mark images 220a and 220b. For example, the wavelength detecting unit 273 may analyze the electrical signals output from the second detector 264 of the pair of horizontally arranged photoelectric sensors 261a and 261b, and may measure the distance between the pair of horizontally formed images of marks 220a and 220b. Additionally, the wavelength detecting unit 273 may receive the wavelength data from the wavelength data memory 272 that corresponds to the measured distance, and may determined the main wavelengths of light entering the image pick-up apparatus 100 using the received wavelength data.

Therefore, it may be possible to determine with sufficient accuracy of the wavelengths of the light that enters the image pick-up apparatus 100 by measuring the distance between the pair of mark images 220a and 220b. In this regard, since no additional components other than the mark 220 may be required, no significant increase in the size and/or the cost of manufacture of the image pick-up apparatus 100 may be necessary.

Figure 6:
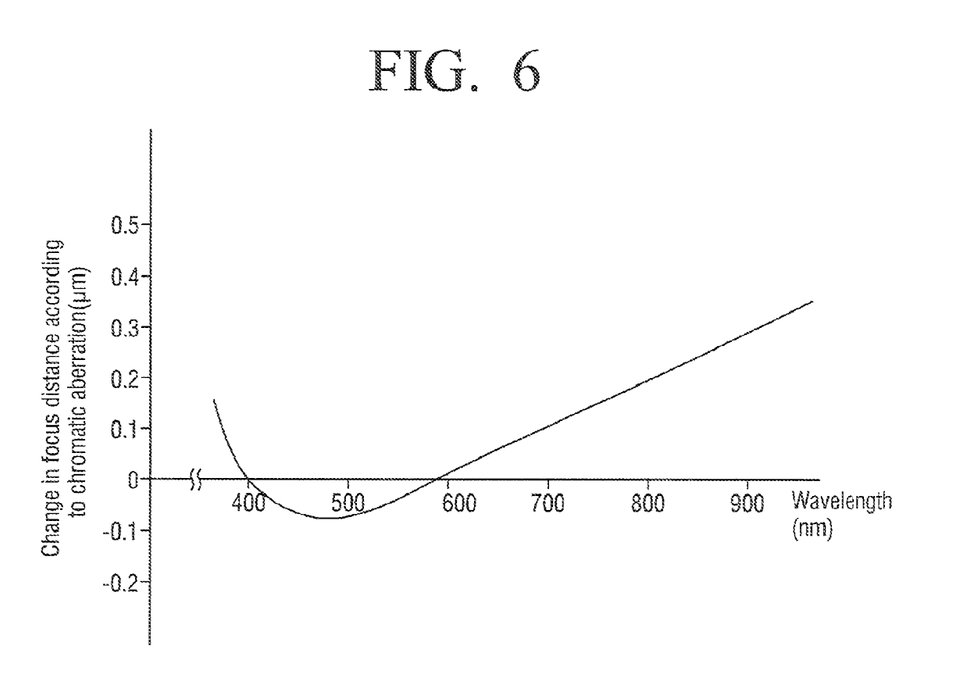
FIG. 6 is a graph showing a change in focus distance according to a chromatic aberration.

FIG. 6 is a graph showing a change in focus distance according to a chromatic aberration. In the graph of FIG. 6, the x-axis represents the wavelength while the y-axis represents the change in the focus distance according to the chromatic aberration. In FIG. 6, a wavelength of 587 nm is used as a reference value. For example, if a wavelength is 800 nm, the focus distance is greater by about 200 nm than a focus distance measured when a wavelength is 587 nm.

The focus detecting apparatus 200 detects the focus state of the lens unit 110 based on the light incident thereon. However, it may be desirable to focus on a subject based on the wavelength (about 587 nm) of the green color to which the human eye is most sensitive. Accordingly, when light with a wavelength of 800 nm is mainly incident on the focus detecting apparatus 200, it is desirable to correct the defocus amount by about 0.2 μm.

The relationship between the wavelength and the change in the focus distance as shown in FIG. 6 depends on the chromatic aberration characteristic of the lens unit 110 and the focus detecting apparatus 200. Data shown in FIG. 6 may be obtained empirically or using analytical methods after the lens unit 110 and the focus detecting apparatus 200 are manufactured.

The correction computing unit 274 computes the chromatic aberration correction amount according to the main wavelength detected by the wavelength detecting unit 273. Chromatic aberration characteristic data of the focus detecting apparatus 200 may be stored in the correction computing unit 274 in the form of a data table or an approximating polynomial coefficient. As described above, different lens units 110 may be mounted interchangeably in the image pick-up apparatus 100. Accordingly, it may be necessary to consider the chromatic aberration characteristic of different lens unit 110. The memory 114 of each lens unit 110 may store the chromatic aberration characteristic data of the lens unit 110, which may be in the form of a data table or an approximating polynomial coefficient. The chromatic aberration characteristic data of the lens unit 110 stored in the memory 114 may be transferred to the correction computing unit 274. The correction computing unit 274 combines the chromatic aberration characteristic data of the focus detecting apparatus 200 with the chromatic aberration characteristic data of the lens unit 110 to form a relationship between the wavelength and the change in the focus distance as shown in FIG. 6. After receiving the main wavelength detected by the wavelength detecting unit 273, the correction computing unit 274 may compute the chromatic aberration correction amount according to the relationship between the wavelength and the change in focus distance as shown in FIG. 6. For example, if a wavelength of 800 nm is detected as a main wavelength by the wavelength detecting unit 273, the chromatic aberration correction amount may be about −0.2 mm, taking into consideration the relationship between the wavelength and the change in the focus distance as shown in FIG. 6.

The secondary defocus computing unit 275 may add the chromatic aberration correction amount computed by the correction computing unit 274 to the primary defocus amount computed by the primary defocus computing unit 271 to obtain a final defocus amount. The final defocus amount computed by the secondary defocus computing unit 275 may be transferred to an AF driver 113 of the lens unit 110 so that the AF driver 113 moves focusing lenses by the final defocus amount.

According to an aspect of the present disclosure, as described above, the wavelength detecting unit 273 may detect the main wavelength of the light entering the image pick-up apparatus 100 while the correction computing unit 274 may compute the chromatic aberration correction amount according to the main wavelength detected by the wavelength detecting unit 273. Therefore, it may be possible to focus on a subject with greater accuracy even when the wavelengths of the light source illuminating the subject are significantly different from the wavelength (about 587 nm) of the green color to which the human eye is most sensitive.

While detailed structures of the focus operation unit 270, the primary defocus computing unit 271, wavelength detecting unit 273, the correction computing unit 274 and the secondary defocus computing unit 275 are not depicted in FIG. 4, as would be readily understood by those skilled in the art, the focus operation unit 270 and/or one or more of the primary defocus computing unit 271, wavelength detecting unit 273, the correction computing unit 274 and the secondary defocus computing unit 275 may be, e.g., a microprocessor, a microcontroller or the like, that may include a central processing unit (CPU) to execute one or more computer instructions to implement the various operations herein described and/or operations relating to one or more other components of the image pick-up apparatus 100, and to that end may further include a memory device, e.g., a Random Access Memory (RAM), Read-Only-Memory (ROM), a flesh memory, or the like, to store the one or more computer instructions. According to an embodiment, the focus operation unit 270 may be a microprocessor or a microcontroller while one or more of the primary defocus computing unit 271, wavelength detecting unit 273, the correction computing unit 274 and the secondary defocus computing unit 275 may be implemented as a computer program or a set of computer instructions that may be executed by the focus operation unit 270. According to alternative embodiments, one or more of the primary defocus computing unit 271, wavelength detecting unit 273, the correction computing unit 274 and the secondary defocus computing unit 275 may be implemented as a hardware component, and may individually be a microprocessor or a microcontroller executing computer instructions to implement the various operations thereof described herein or any other circuitries providing a hardware implementation of the operations.

Figure 7:
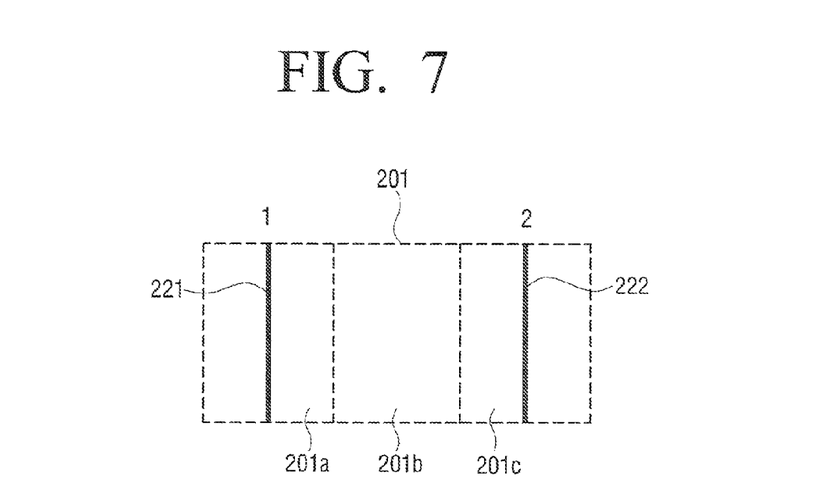
FIG. 7 illustrates an arrangement of marks according to another embodiment of the present disclosure.
Figure 8:
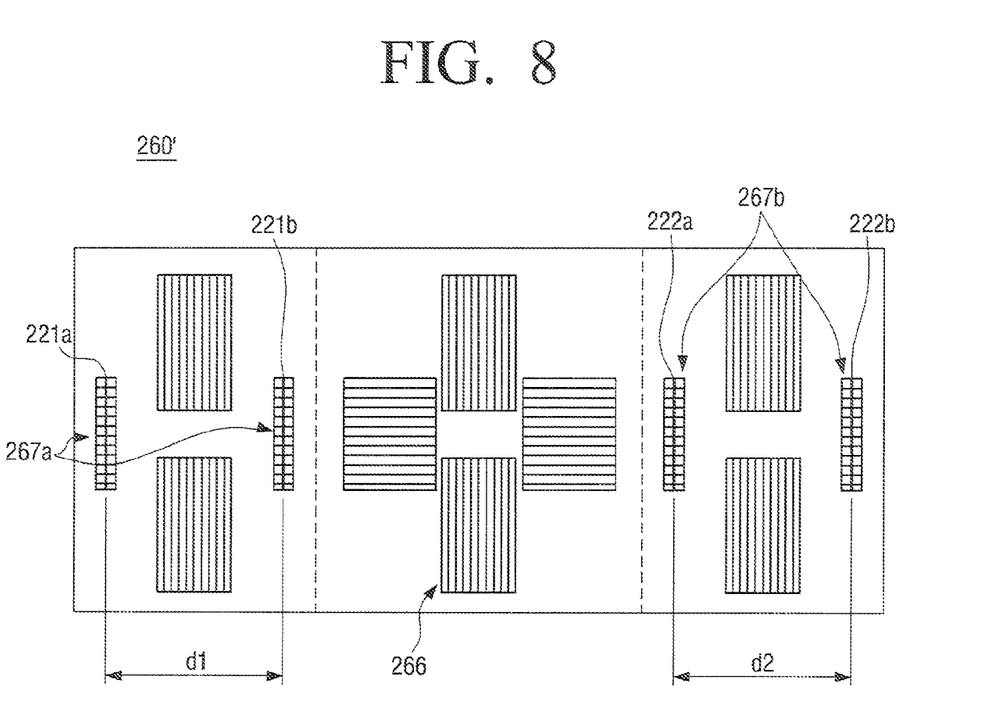
FIG. 8 is a plan view of a sensor unit according to another embodiment of the present disclosure.

With reference to FIGS. 7 and 8, another embodiment of the present disclosure will be described. For the sake of brevity, in the following descriptions, only those constructions and configurations other than or different from those previously described above will be described.

FIG. 7 illustrates the arrangement of marks according to another embodiment of the present disclosure. FIG. 8 shows a plan view of a sensor unit according to another embodiment.

Referring to FIG. 7, two marks 221 and 222 are arranged on the primary image plane 201 whereas in the previously-described embodiments only one mark (e.g., the mark 220 shown in FIG. 2) was used. The first mark 221 may be provided on the first area 201a of the primary image plane 201 while the second mark 222 may be provided on the third area 201c of the primary image plane 201, for example. It should be noted however that no limitation is being contemplated as to the number and/or the positions of the marks, which may vary.

As shown in FIG. 8, the sensor unit 260' may include a first photoelectric sensor 266 for detecting the image of a subject and a plurality of second photoelectric sensors 267a and 267b for detecting the images of the first and second marks 221 and 222. The images of the first and second marks 221 and 222 may be formed on the plurality of second photoelectric sensors 267a and 267b. In FIG. 8, the reference numerals 221a and 221b denote the images of the first mark 221 while the reference numerals 222a and 222b denote the images of the second mark 222.

A first wavelength corresponding to the distance d1 between the pair of the images 221a and 221b of the first mark 221 and a second wavelength corresponding to distance d2 between the pair of the images 222a and 222b of the second mark 222 may be computed based on the relationship between the wavelength and the change in the distance between a pair of mark images, e.g., the relationship according to FIG. 5. According to an embodiment, the wavelength detecting unit 273 may set the main wavelength of the light entering the image pick-up apparatus 100 to be the average value of the first wavelength and the second wavelength.

As described above, according to an embodiment, a plurality of marks, e.g., the marks 221 and 222, may be used so as to realize a more stable computation of the main wavelength of the light entering the image pick-up apparatus 100.

The foregoing several embodiments are merely illustrative examples, and are not to be construed as limiting the scope of the present disclosure. The teaching of the present disclosure can be readily applied to other types of devices and apparatuses. Also, the description of the embodiments of the present disclosure is intended to be illustrative and non-limiting, to which embodiments, as it would be appreciated by those skilled in the art, various changes may be made without departing from the principles and spirit of the disclosure, the scope of which is defined in the appended claims and their equivalents.

What is claimed is:

1. A focus detecting apparatus for use in an image pick-up apparatus, comprising:
    a mark arranged on a primary image plane;
    a sensor unit on which a pair of images of the subject and a pair of images of the mark are formed;
    a primary defocus computing unit configured to compute a primary defocus amount according to a distance between the pair of images of the subject;
    a wavelength detecting unit configured to determine a main wavelength of light entering the image pick-up apparatus according to a distance between the pair of images of the mark;
    a correction computing unit configured to compute a chromatic aberration correction amount according to the main wavelength determined by the wavelength detecting unit; and
    a secondary defocus computing unit configured to add the chromatic aberration correction amount to the primary defocus amount to obtain a final defocus amount.

2. The focus detecting apparatus according to claim 1, wherein the mark comprises a straight line.

3. The focus detecting apparatus according to claim 1, wherein the mark comprises a plurality of marks each arranged on the primary image plane.

4. The focus detecting apparatus according to claim 3, wherein a plurality of pair of mark images is formed on the image sensor unit, each of the plurality of pair of mark images corresponding to a respective associated one of the plurality of marks, and
    wherein the wavelength detecting unit is configured to determine the main wavelength of the light entering the image pick-up apparatus to be an average of wavelengths corresponding to respective distances between each pair of mark images.

5. The focus detecting apparatus according to claim 1, further comprising:
    a wavelength data memory configured to store therein wavelength data corresponding to the distance between the pair of images of the mark.

6. The focus detecting apparatus according to claim 5, wherein the wavelength data comprises a data table.

7. The focus detecting apparatus according to claim 5, wherein the wavelength data comprises an approximating polynomial coefficient.

8. The focus detecting apparatus according to claim 1, wherein the correction computing unit is configured to receive chromatic aberration characteristic data of a lens unit of the image pick-up apparatus.

9. The focus detecting apparatus according to claim 1, wherein the sensor unit comprises a plurality of photoelectric sensors.

10. The focus detecting apparatus according to claim 9, wherein the plurality of photoelectric sensors comprise:
    a first detector configured to detect the pair of images of subject, the first detector being a first subset of the plurality of photoelectric sensors; and
    a second detector configured to detect the pair of images of the mark, the second detector being a second subset of the plurality of photoelectric sensors.

11. The focus detecting apparatus according to claim 9, wherein the sensor unit comprises:
    a first photoelectric sensor configured to detect the pair of images of the subject; and
    a second photoelectric sensor configured to detect the pair of images of the mark.

12. An image pick-up apparatus, comprising:
    a lens unit configured to focus light received from a subject;
    a focus detecting apparatus configured to detect a focus state of the lens unit; and
    an image pickup area exposed to the light received from the subject,
    wherein the focus detecting apparatus comprises:
        a mark arranged on a primary image plane;
        a sensor unit on which a pair of images of the subject and a pair of images of the mark are formed;
        a primary defocus computing unit configured to compute a primary defocus amount according to a distance between the pair of images of the subject;

a wavelength detecting unit configured to determine a main wavelength of light entering the image pick-up apparatus according to a distance between the pair of images of the mark;

a correction computing unit configured to compute a chromatic aberration correction amount according to the main wavelength determined by the wavelength detecting unit; and a secondary defocus computing unit configured to add the chromatic aberration correction amount to the primary defocus amount to obtain a final defocus amount.

13. An apparatus for detecting a state of focus of an image acquiring apparatus that acquires an image of a subject by receiving light from the subject, comprising:

a mark arranged on a primary image plane;

one or more image sensors arranged in an optical path of the light such that the one or more image sensors receive a pair of images of the mark, the one or more image sensors being configured to output an electrical signal representative of the pair of images of the mark; and a focus operation controller having an input through which to receive the electrical signal output by the one or more image sensors, the focus operation controller being configured to determine a main wavelength associated with the light based on a distance between the pair of images of the mark, the focus operation controller being further configured to determine the state of focus based at least in part on the determined main wavelength.

14. The apparatus of claim 13, wherein the one or more image sensors receive a pair of images of the subject in addition to the pair of images of the mark, and wherein the focus operation controller comprises:

a primary defocus computing unit configured to determine a primary defocus amount according to a distance between the pair of images of the subject;

a wavelength detecting unit configured to determine the main wavelength of the light according to the distance between the pair of images of the mark;

a correction computing unit configured to determine a chromatic aberration correction amount according to the main wavelength determined by the wavelength detecting unit; and a secondary defocus computing unit configured to add the chromatic aberration correction amount to the primary defocus amount to obtain a final defocus amount.

15. The apparatus of claim 13, wherein the one or more image sensors receive a pair of images of the subject in addition to the pair of images of the mark, and wherein the focus operation controller is further configured to determine a primary defocus amount according to a distance between the pair of images of the subject, to determine a chromatic aberration correction amount according to the determined main wavelength, and to add the chromatic aberration correction amount to the primary defocus amount to obtain a final defocus amount.

16. The apparatus of claim 13, wherein the one or more image sensors comprises:

a first one or more photoelectric sensors arranged to receive the pair of images of the subject; and a second one or more photoelectric sensors arranged to receive the pair of images of the mark.

17. The apparatus of claim 13, wherein the focus operation controller is configured to perform a look-up operation from a look-up table that includes a distance-to-wavelength correlation information so as to determine the main wavelength associated with the light.

18. The apparatus of claim 15, wherein the focus operation controller is configured to determine the chromatic aberration correction amount by performing a look-up operation from a look-up table that includes an information regarding correlations between wavelengths and chromatic aberration correction amounts.

* * * * *